United States Patent
Kojima et al.

(10) Patent No.: US 6,384,848 B1
(45) Date of Patent: *May 7, 2002

(54) MESSAGE HANDLING APPARATUS AND METHOD

(75) Inventors: Yoshihiro Kojima; Shinichirou Yamaguchi, both of Gifu; Toshitaka Hasegawa, Kasugai, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,011

(22) Filed: Jun. 10, 1998

(30) Foreign Application Priority Data

Dec. 25, 1997 (JP) ................................ 9-357234

(51) Int. Cl.$^7$ ................................ G06F 3/00

(52) U.S. Cl. ........................ 345/808; 345/975; 345/809; 345/966; 714/2; 714/48; 714/57

(58) Field of Search ................................ 345/347, 326, 345/340, 965, 966, 975, 808, 809, 700; 714/46, 48, 49, 57, 2

(56) References Cited

U.S. PATENT DOCUMENTS

| | | | | |
|---|---|---|---|---|
| 5,237,677 A | * | 8/1993 | Hirosawa et al. | |
| 5,307,354 A | * | 4/1994 | Cramer et al. | |
| 5,423,000 A | * | 6/1995 | Kimura et al. | 713/1 |
| 5,748,880 A | * | 5/1998 | Ito et al. | 714/46 |
| 5,748,884 A | * | 5/1998 | Royce et al. | 714/57 |
| 5,909,215 A | * | 6/1999 | Berstis et al. | 345/340 |
| 6,038,679 A | * | 3/2000 | Hanson | 714/5 |

* cited by examiner

*Primary Examiner*—Raymond J. Bayerl
*Assistant Examiner*—Sy D. Luu
(74) *Attorney, Agent, or Firm*—Staas & Halsey LLP (57) ABSTRACT

An apparatus and method for handling messages output to a computer console, including easy and accurate definition of message handling procedures. The apparatus includes a response definition unit that dynamically selects a console message, receives definition information pertaining thereto, and stores the information in a storage unit. The received definition information defines at least a portion of a predetermined procedure to be executed in response to the selected message. The selected message may be displayed on a display unit in a message selection window. The received definition information may be entered through a definition window. When the selected message is reported to the apparatus, a response execution unit, coupled to the storage unit, executes the predetermined procedure.

31 Claims, 7 Drawing Sheets

| DATE | TIME | CODE | MESSAGE |
|---|---|---|---|
| 1997/11/21 | 10:01 | ABC001 | SYSTEM ERROR |
| 1997/11/21 | 10:02 | ABC002 | APPLICATION ERROR |
| 1997/11/21 | 10:04 | ABC003 | DEVICE ERROR |
| 1997/11/21 | 10:05 | ABC004 | COMMUNICATION ERROR |
| 1997/11/21 | 10:22 | ABC005 | OPERATION ERROR |

| DATE | TIME | CODE | MESSAGE |
|---|---|---|---|
| 1997/11/21 | 10:01 | ABC001 | SYSTEM ERROR |
| 1997/11/21 | 10:02 | ABC002 | APPLICATION ERROR |
| 1997/11/21 | 10:04 | ABC003 | DEVICE ERROR |
| 1997/11/21 | 10:05 | ABC004 | COMMUNICATION ERROR |
| 1997/11/21 | 10:22 | ABC005 | OPERATION ERROR |

FIG. 3

| DATE | TIME | CODE | MESSAGE |
|---|---|---|---|
| 1997/11/21 | 10:01 | ABC001 | SYSTEM ERROR |
| 1997/11/21 | 10:02 | ABC002 | APPLICATION ERROR |
| 1997/11/21 | 10:04 | ABC003 | DEVICE ERROR |
| 1997/11/21 | 10:05 | ABC004 | COMMUNICATION ERROR |
| 1997/11/21 | 10:22 | ABC005 | OPERATION ERROR |

FIG. 4

◇ NON-DISPLAY OF MESSAGE  ● YES  ○ NO
◇ RINGING OF PAGER  ● YES  ○ NO
TEL. NO: 03-1234-5678
DISPLAY MESSAGE  IRREGULAR EVENT IS GENERATED IN THE CENTER 1
◇ EXECUTION OF COMMAND  ● YES  ○ NO
COMMAND NAME  COMMAND 1

[OK]  [CANCEL]

FIG. 5

| CODE | NON-DISPLAY | PAGER | NO. | DISPLAY MESSAGE | COMMAND EXECUTION | COMMAND |
|---|---|---|---|---|---|---|
| ABC0001 | YES | YES | 03-1234-5678 | IRREGULAR EVENT IS GENERATED IN THE CENTER! | YES | RECOVER |
| | | | | | | |
| | | | | | | |
| | | | | | | |

MESSAGE HANDLING APPARATUS AND METHOD

CROSS-REFERENCE TO RELATED APPLICATIONS

This application claims the benefit, under applicable provisions of U.S. law, of Japanese Application No. 9-357234, which was filed in the Japanese Patent Office on Dec. 25, 1997, and the disclosure of which is incorporated herein by reference.

BACKGROUND OF THE INVENTION

The present invention relates to a message handling apparatus (i.e., an apparatus for dealing with messages) for automatically executing a certain response to messages generated by a computer.

During operation of a computer system various messages are notified to a special terminal called a console. The console displays such messages on a display screen. In general, a knowledgeable operator monitors the displayed messages, obtains an understanding of the content of the messages, and takes necessary action.

For example, when a magnetic tape mount request message is displayed, the operator loads the designated magnetic tape onto a magnetic tape unit. When a message notifying a shortage of printer paper is displayed, the operator loads the attached printer with more printer paper. When a message notifying an abnormal end of a program is displayed, the operator inputs a command from a keyboard of the console to re-start the abnormally ended program. When a message notifying an irregular condition of hardware is displayed, the operator personally contacts a hardware maintenance person.

A suggestion to ease the load on the operator has been proposed in Japanese Published Unexamined Patent Application No. H5-14492. A series of commands, corresponding to message outputs from a switching machine, are stored. When a message is output, the operator workload is reduced by automatically executing the commands corresponding to the message.

This reduction in operator workload, by automatic operation, is executed not only in the switching machine but also in the computer. However, such related art has a disadvantage to be explained. In the related art it is required to previously define the responses to be executed for the messages output from the switching machine and the computer. Namely, the commands to be executed must be defined previously for all output messages, or at least for a select number of necessary messages.

If commands are set for all messages, the commands must be set for each message even though many of the messages are not output in real operation. On the other hand, when only those messages considered necessary have associated commands, if a message is selected erroneously at the time of selection of necessary messages, then (in some cases) a command is not executed in response to the message, even though the command is intended to be executed automatically.

In any case, the existing approach requires response definitions to be registered before operation, and a definition cannot be dynamically changed. To define responses for new messages and non-selected messages currently being displayed, various processes are required. In particular, the operation has to be interrupted after storing information identifying the message or preparing a copy of such information. Alternatively, the definition information is changed when operation is completed and thereafter the operation has to be restarted.

Moreover, the operator himself has been required to execute adequate responses for messages which cannot be processed with only the stored commands. Therefore, an operator is required to monitor the messages output. If the operator fails to timely notice an output messages, the necessary response is not executed or else is executed with a certain delay.

In addition, when a large number of messages are displayed, important messages are hidden by other messages and may, to a large extent, fail to be noticed.

SUMMARY OF THE INVENTION

Accordingly, it is an object of the present invention to enable dynamic alteration of predefined responses to console messages.

In is also an object of the present invention to eliminate the requirement for an operator to always monitor the messages output to the console.

It is a further object of the present invention to lower the risk that important output messages will fail to be noticed by being hidden among other output messages.

Additional objects and advantages of the invention will, in part, be set forth in the description that follows and will, in part, be apparent from the description or may be learned by practice of the invention as described.

To achieve objects thereof, the present invention provides a message handling apparatus comprising a response definition unit, coupled to a storage unit and an input device, and a response execution unit. The response definition unit dynamically selects a console message from a plurality of console messages, receives definition information input to the input device, and stores the received definition information to the storage unit. Each of the plurality of console messages provides corresponding status information regarding a computer system. The received definition information defines at least a portion of a predetermined procedure to be executed in response to the selected console message. The response execution unit is coupled to the storage unit and executes the predetermined procedure in response to the selected console message.

The present invention also achieves objects thereof by providing a method of message handling, the method comprising the steps of selecting a console message, creating definition information, storing the created definition information, and executing a predetermined procedure in response to the selected console message. The selected console message is selected from a plurality of console messages, each of which provides corresponding status information regarding a computer system. The created definition information defines at least a portion of a predetermined procedure to be executed in response to the selected console message.

BRIEF DESCRIPTION OF THE DRAWINGS

These and other objects and advantages of the invention will become apparent and more readily appreciated from the following description of the preferred embodiments when taken in conjunction with the accompanying drawings, in which.

DESCRIPTION OF THE PREFERRED EMBODIMENTS

Reference will now be made in detail to the presently preferred embodiments of the present invention, examples of which are illustrated in the accompanying drawings, wherein like reference numerals refer to like elements throughout.

Figure 2:
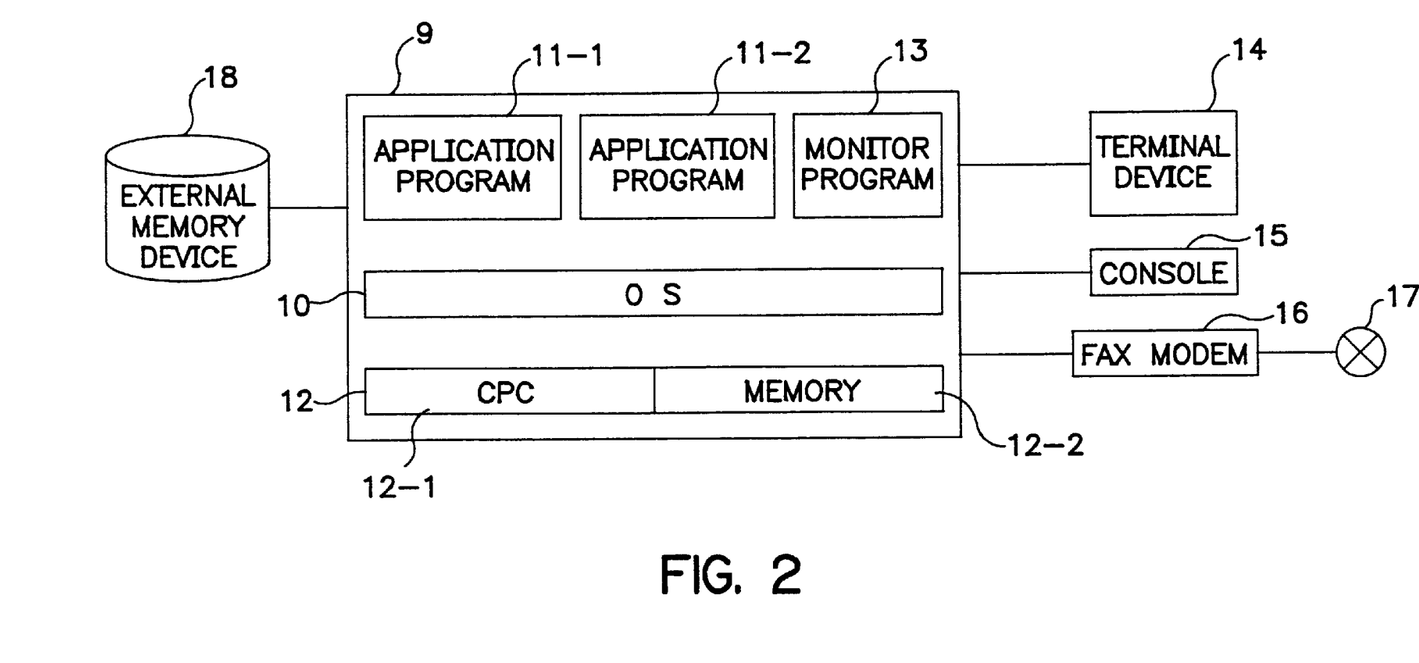
FIG. 2 is a diagram of an exemplary structure of an object system to which the present invention is applied.

FIG. 2 is a block diagram of the structure of a system to which the present invention may be applied. In this system, an external memory device 18, a terminal device 14, a console 15, and a FAX modem 16 are connected to a computer 9.

The computer 9 has processing section 12 with a processing unit (CPC) 12-1 and a memory 12-2 that executes a plurality of application programs 11 (11-1, 11-2, etc.) and a monitor program 13 under the control of an operating system (OS) 10.

Usual manipulations for the application programs 11 are conducted through the terminal device 14. Terminal device 14 is typically composed of a display unit, a keyboard and a mouse, etc. (not shown).

If a certain irregular event occurs during execution of operating system 10 or an application program 11, messages are output. The output messages are collected by monitor program 13 and are output to console 15. In addition, a message identification code is assigned to each of the messages output from operating system 10 and application program 11-n.

Console 15 typically has a composition similar to terminal device 14, having a display unit, a keyboard and a mouse (not shown). The I/O of console 15 is controlled by monitor program 13.

External memory device 18 stores various kinds of data and programs, etc. FAX modem 16 communicates with a FAX device, a pager center, and various devices, such as other computers, connected via a telephone line 17 using application programs 11-n operating on computer 9.

Figure 1:
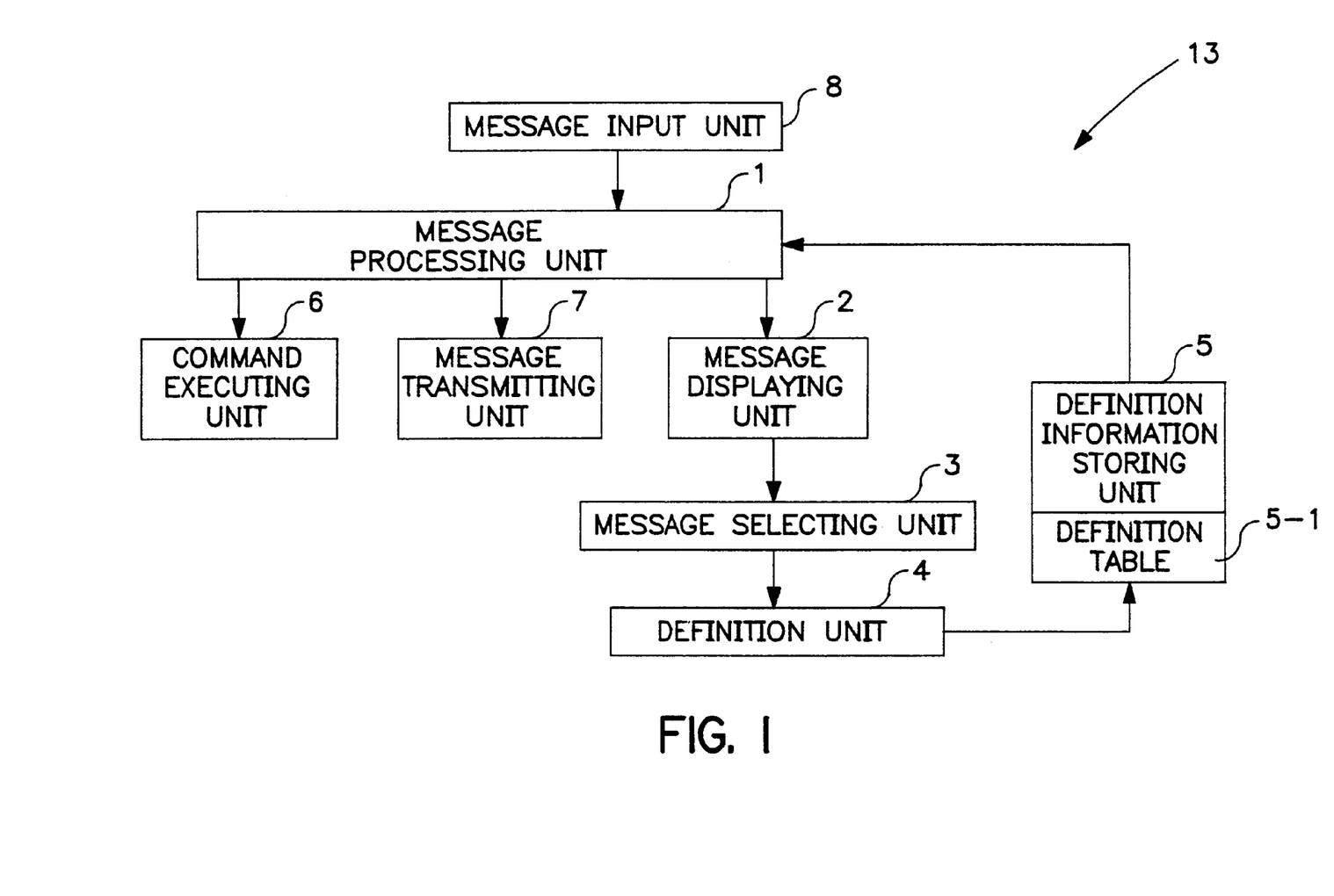
FIG. 1 is a block diagram of an embodiment of the present invention.

In a preferred embodiment of the present invention, as shown in FIG. 1, the present invention is embodied in monitor program 13 and a definition table 5-1. A message processing unit 1 processes messages for command execution and message definition. A message displaying unit 2 displays messages on a display device such as the display unit (not shown) of console 15. In accordance with a preferred embodiment, message displaying unit 2 displays a plurality of messages in a display window (to be described below).

A message selecting unit 3 receives a message selection input, such as from a mouse (not shown) connected to console 15, and selects a message for message definition in response thereto. A definition unit 4 receives definition information from, for example, the keyboard (not shown) connected to console 15. The received definition information defines at least a portion of a predetermined procedure to be executed by message processing unit 1 in response to reporting of a selected message to message processing unit 1 from a message input unit 8. Definition unit 4 stores the received definition information to a definition information storage unit 5. In accordance with a preferred embodiment, definition information for the selected message, including the received definition information, is stored to definition information storage unit 5 in a definition table 5-1.

Definition table 5-1 defines the various response procedures to be automatically executed for respective output messages. During execution of monitor program 13, definition table 5-1 is arranged in memory 12-2, otherwise definition table 5-1 is stored in external memory device 18.

Figure 6:
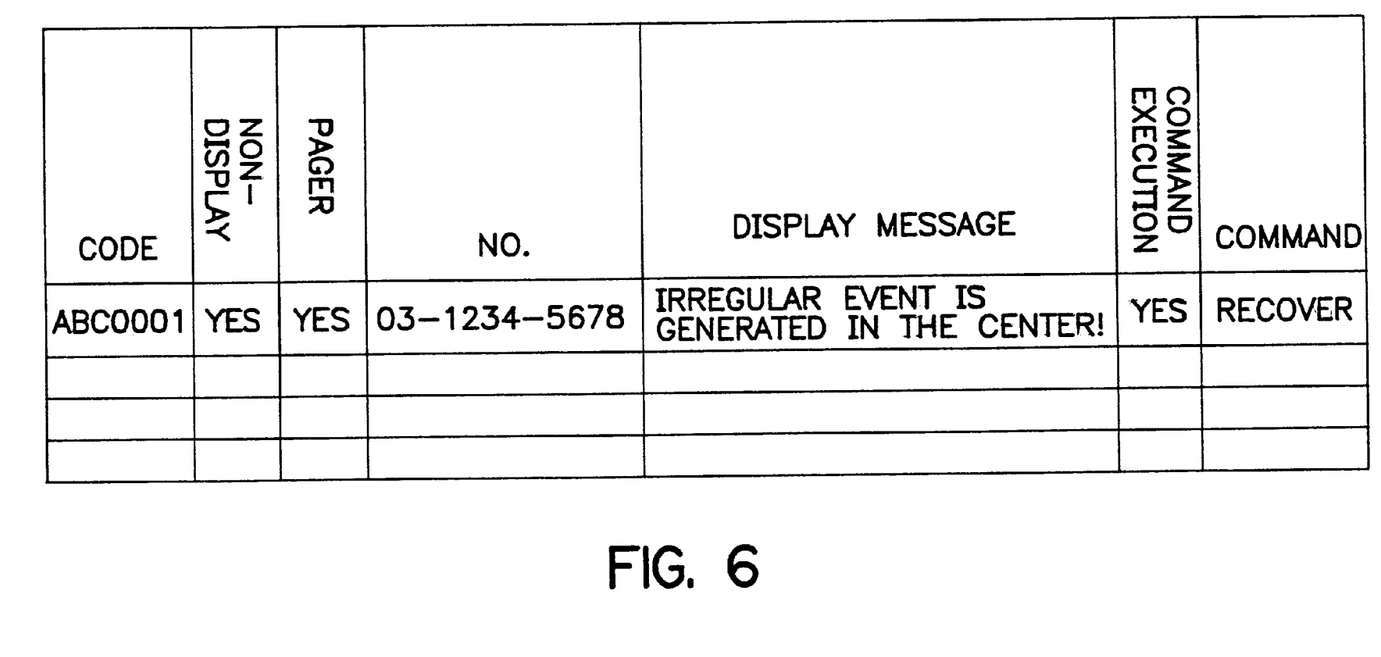
FIG. 6 is a definition table in accordance with the present invention.

FIG. 6 shows an example of definition table 5-1. The upper most row of the table shown in FIG. 6 identifies the information stored in each corresponding column. In the first column, the message identification code is stored. In the second column, an instruction for whether to display the message is stored. When the content of this column is YES, the message is not displayed.

The messages output from operating system 10 and application program 11 include very important ones and those which may be neglected without any problem. Display of unwanted messages can be avoided by designating the no-display mode for those messages.

In the third column, an instruction is stored indicating whether a corresponding message should be transmitted to a pager when the message for the console is output. In the fourth column the pager number is stored, and in the fifth column, a message to be transmitted to the pager is stored.

A certain message indicates a fault to which an adequate response cannot be performed by only an operator. If such a message is displayed, the operator is requested to contact an authorized maintenance person. In this case, contact with the maintenance person can be made automatically simply by setting the message to transmit a message to the pager of the maintenance person.

In the fifth column, an instruction is stored indicating whether to execute a certain command when a message is output. The sixth column stores the command to be executed. In the case of certain messages, the problem which caused the message to be output can be solved, i.e., corrected only by executing one or a plurality of commands. In this case, an operator is not required to make any response i.e., no intervention by the operator is required, so long as the command for this purpose is set.

The second row indicates an example of practical definition content for a message. This example defines that the message has the identification code "ABC0001"; when this message is output, the message is not displayed; the message "irregular event is generated in the center 1" is transmitted to the pager having the number "03-1234-5678"; and the command "RECOVER" is executed.

Figure 7:
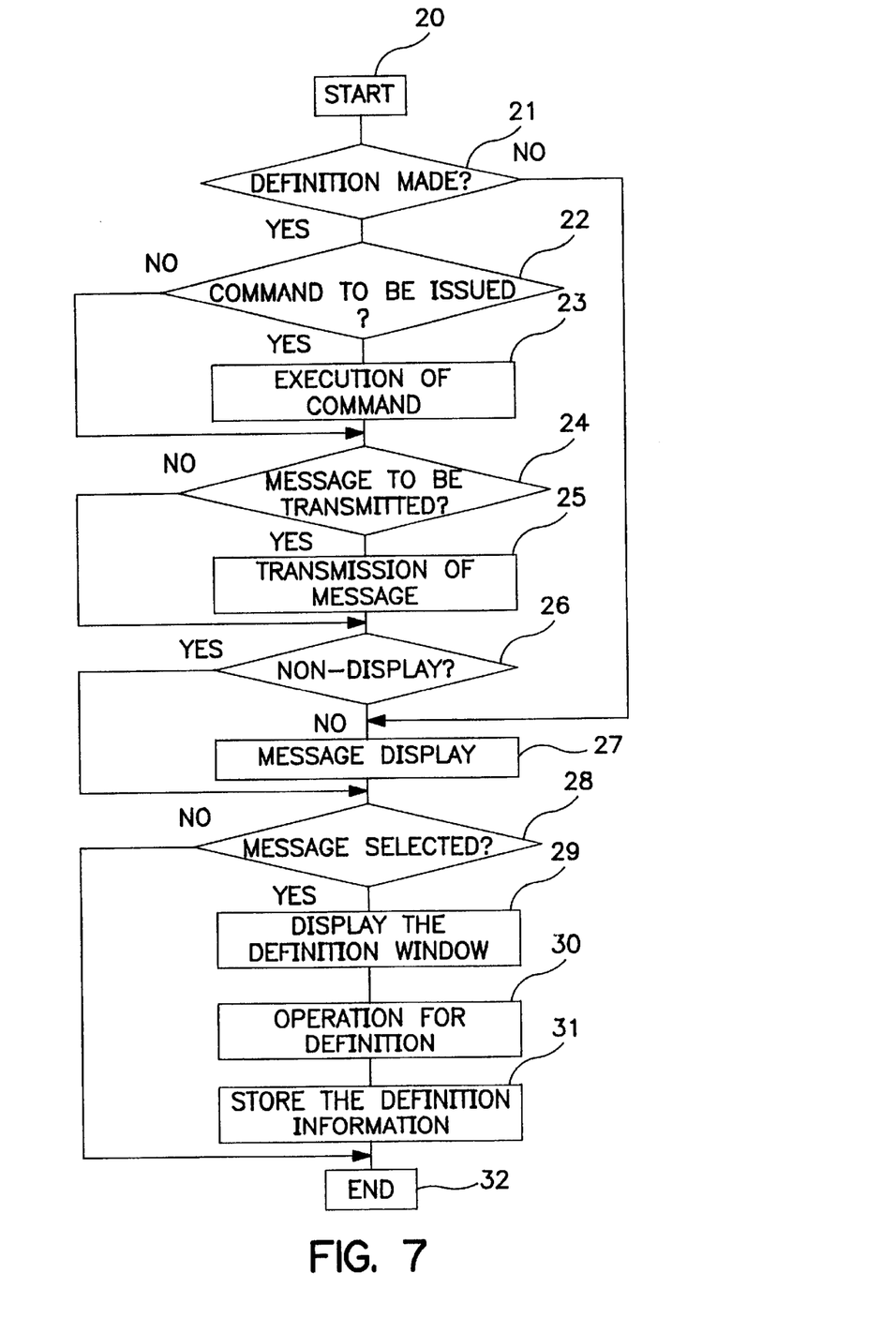
FIG. 7 is a flow chart illustrating the process of a monitor program in accordance with the present invention.

Monitor program 13 executes a process in accordance with the flow chart shown in FIG. 7. The process starts at step 20. When a message output from operating system 10 or application program 11 is input, whether a response for this message has been defined is determined at step 21.

Since a message identification code is given to all output messages, determination of a defined response and recognition of response content for such a definition are carried out simultaneously. This is done by retrieving the definition table information using the message identification code as a key.

If a definition is not registered in definition table 5-1, then the operation goes to step 27. When a definition is registered in the definition table, then whether a command is defined is determined at step 22. When a command is defined, the operation goes to step 24 after execution of the command at step 23. In accordance with the preferred embodiment, the command is executed at step 23 by a command execution unit 6. If a command is not defined, then the operation goes to step 24 by skipping step 23.

At step 24, it is determined whether the corresponding message is to be transmitted. When message transmission is defined, the corresponding message is transmitted at step 25 and thereafter the operation goes to step 26. If message transmission is not defined, then the operation goes to step 26 by skipping step 25. During the message transmission step 25, a connection is extended, via FAX modem 16, to the pager center connected to telephone line 17. The pager number of the message transmission destination, preset in the definition table, and the message to be displayed on the pager, are transmitted in accordance with the communication protocol of the pager center. Thereby, the pager center instructs the pager having the designated number to display the designated message. As a result, the message is displayed on the pager. In accordance with the preferred embodiment, a message transmitting unit 7 establishes the connection and controls the transmission of the message to the pager center.

At step 26, it is determined whether to display the message. When display of the message is instructed, a message display process is executed at step 27. The message display of step 27 is also executed when it is determined at step 21 that a process for the message is not defined.

Figure 3:
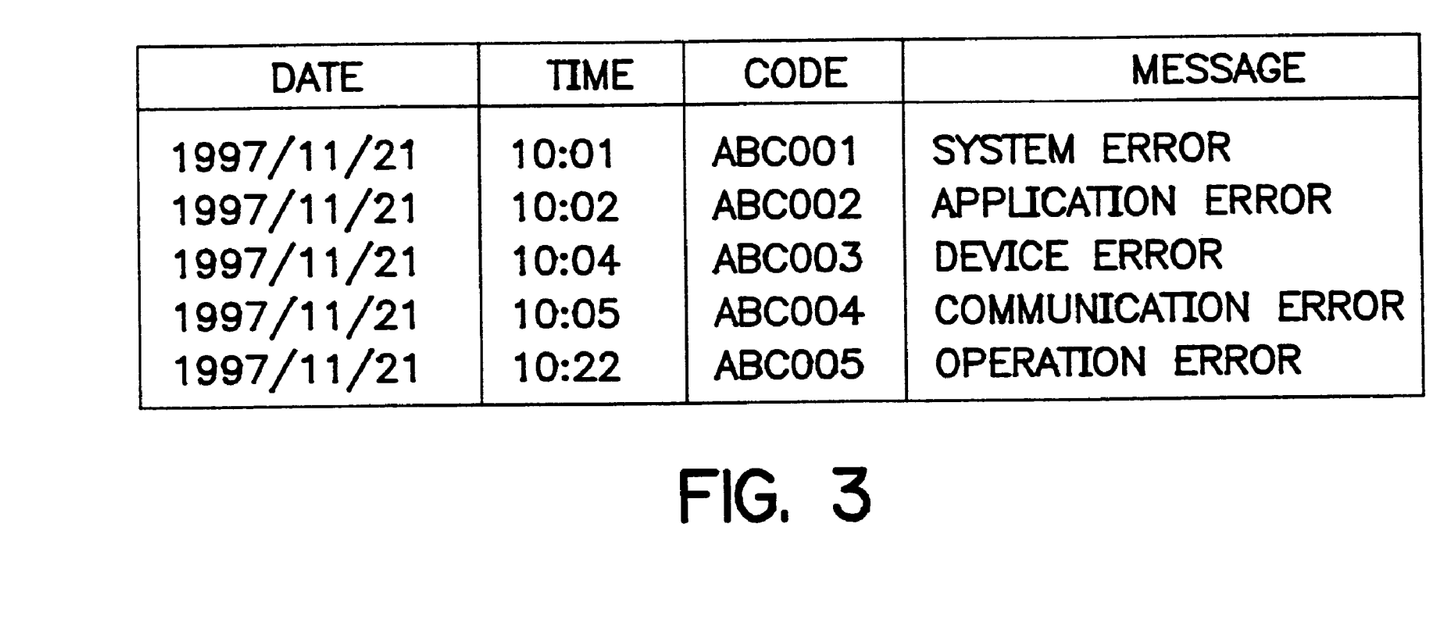
FIG. 3 is a diagram illustrating a message display window in accordance with the present invention.

FIG. 3 shows an example of a display window for message output on the display unit (not shown) of console 15. In the example of FIG. 3, five messages are displayed, each with date, time and code. The displayed date indicates the date of the message output. The displayed time indicates the time of the message output. The code is the identification information previously assigned to the output message. At step 28, after the message is output at step 27 or message non-display is instructed at step 26, it is determined whether an instruction is issued for selection of the message being displayed.

Figure 4:
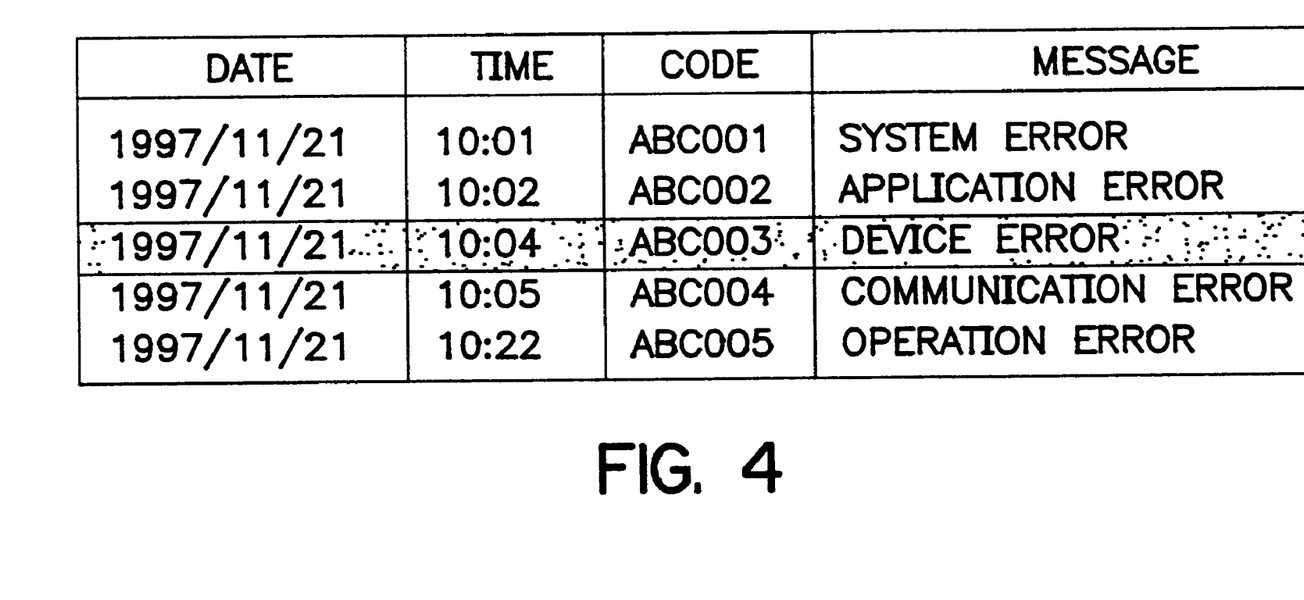
FIG. 4 is a diagram illustrating a message selection condition on a message display window in accordance with the present invention.

FIG. 4 shows an example of displayed message selection. An operator can select the message being displayed by operating the mouse. The mouse cursor is placed on the message being displayed within the message display window to video-invert the message. Message selection can be indicated by a double click of the mouse button. When the message is selected, a definition window is output to the display unit at step 29. The response for the message can be set when the operator uses the definition window.

Figure 5:
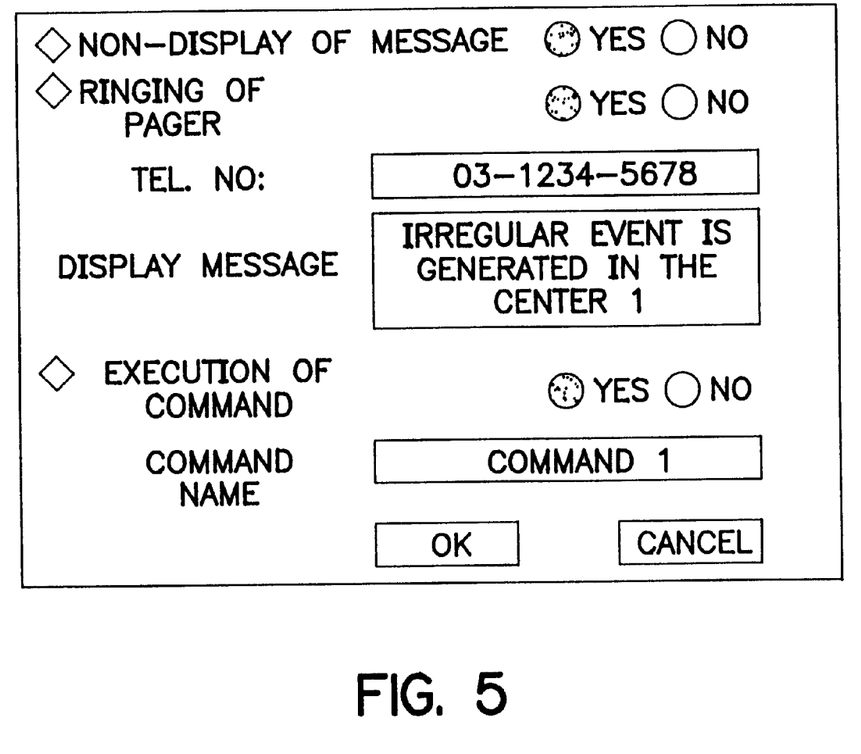
FIG. 5 is a diagram of a definition window in accordance with the present invention.

FIG. 5 shows an example of the definition window. The definition window has an item for selecting whether the message is displayed; an item for selecting whether the message is to be transmitted to the pager; a field for inputting the pager number; a field for inputting a message to be transmitted to the pager; an item for selecting whether a command is to be executed; and a field for inputting the command to be executed.

As to the selection of items, "YES" or "NO" is selected by operating the mouse. Characters can be input to the input fields by operating the keyboard. Upon completion of a response definition by operation of the definition window, the preset information is stored in definition table 5-1 at step 31 (FIG. 7). The process of monitor program 13 is completed, as explained above at step 32 (FIG. 7).

The message handling method has been described above in terms of non-display of a message, transmission of a message to the pager, and execution of a command. However, methods encompassed by the present invention are not limited to such specific embodiments. For example, it is possible to combine various response methods as required, including generation of electronic mail, reading of a message from a voice output apparatus, generation of a warning sound, and so forth.

According to the present invention, the displayed message is selected on the display screen and a response content is defined for the selected message. Therefore, the response can easily be added for a later output of the same message. In addition, a mistake in selection of the message can also be eliminated.

With the present invention, an operator is not required always to monitor the messages output to the display unit. In addition, since the message to be displayed on the display unit is also selectively displayed, the risk that important messages fail to be noticed, because the important messages are hidden among the other messages, can be lowered.

Although a few preferred embodiments have been shown and described, it will be appreciated by those skilled in the art that changes may be made in these embodiments without departing from the principles and spirit of the present invention. Accordingly, the present invention includes all such embodiments and variations, to the extent that the same are included in the scope of the invention as defined by the claims appended hereto or are equivalent to the subject matter defined thereby.

What is claimed is:

1. A message handling apparatus, comprising:

a message processing unit processing messages for command execution and message definition and comprising a message display unit displaying received messages, a message selecting unit controllable by an operator for selecting a message to be provided with definition information and a definition unit displaying a definition window defining plural automatically performed procedures selectable by the operator as definition information for a respective, selected message;

a response definition unit, coupled to a storage unit and an input device, that dynamically selects a console message from a plurality of console messages, receives the respective definition information input to the input device for the selected console message, and stores the received, respective definition information to the storage unit, each of the plurality of console messages providing corresponding status information regarding a computer system and at least one console message indicating a fault status, and the received, respective definition information defining at least a portion of a predetermined procedure to be executed automatically by the message handling apparatus in response to the selected console message indicating a fault status; and a response execution unit coupled to the storage unit and, in response to the selected console message, automatically executing the predetermined procedure and thereby correcting the fault.

2. The message handling apparatus of claim 1, wherein the received definition information includes first information indicating whether the predetermined procedure includes display of the selected console message on a display unit.

3. The message handling apparatus of claim 2, wherein the predetermined procedure includes display of the selected console message on the display unit.

4. The message handling apparatus of claim 1, further comprising a message displaying unit that displays the selected message on a display unit when the predetermined procedure includes display of the selected console message.

5. The message handling apparatus of claim 1, wherein the storage unit stores definition information including the received definition information and comprising:
- a message identification code that identifies the selected console message;
- a text for the selected console message; and
- an indication of whether the predetermined procedure includes execution of a specified command.

6. The message handling apparatus of claim 1, wherein said response definition unit selects the selected console message in response to a message selection input.

7. The message handling apparatus of claim 1, further comprising a message transmission unit that transmits a specified message to another apparatus in response to the selected console message when the predetermined procedure includes transmitting the specified message.

8. The message handling apparatus of claim 7, wherein the other apparatus is a paging system.

9. The message handling apparatus of claim 6, further comprising a display unit, and wherein:
- at least one of the plurality of console messages is displayed on said display unit, the at least one console message including the selected console message; and
- the message selection input is generated by a pointing operation carried out with a pointing device coupled to said display unit, the pointing operation indicating selection of the selected console message.

10. The message handling apparatus of claim 1, wherein the received definition information defines the predetermined procedure to include execution of a specified command.

11. The message handling apparatus of claim 1, wherein said response definition unit comprises:
- a message selecting unit that selects the selected console message in response to a message selection input;
- a message displaying unit that displays the selected console message on a display unit; and
- a definition unit that receives the received definition information in response to a message definition input.

12. A method of message handling, comprising the steps of:
- selecting a console message from a plurality of console messages, each of the plurality of console messages providing corresponding status information regarding a computer system and at least one console message indicating a fault status;
- processing messages for command execution and message definition and comprising displaying received messages selectable by an operator to be provided with definition information and displaying a definition window defining plural automatically performed procedures selectable by the operator as definition information for a respective, selected message, the definition information defining at least a portion of a predetermined procedure to be executed automatically by the computer system in response to a selected console message indicating a fault status;
- storing the created definition information; and
- when a console message is selected indicating a fault status, automatically executing the predetermined procedure and thereby correcting the fault.

13. The method of claim 12, wherein the creating step includes defining whether the predetermined procedure includes display of the selected console message on a display unit.

14. The method of claim 12, wherein the predetermined procedure includes display of the selected console message on the display unit.

15. The method of claim 12, wherein:
- the storing step stores the created definition information to a storage unit storing other definition information corresponding to the selected console message, whereby the other definition information is modified to include the created definition information; and
- the modified definition information, including the created definition information, includes:
  - a message identification code that identifies the selected console message;
  - a text for the selected console message; and
  - an indication of whether the predetermined procedure includes execution of a specified command.

16. The method of claim 12, wherein the predetermined procedure includes transmitting to a specified apparatus a specified message corresponding to the selected console message.

17. The method of claim 16, wherein the specified apparatus is a paging system.

18. The method of claim 12, wherein the selecting step includes the steps of:
- displaying at least one of the plurality of console messages on a display unit, the at least one console message including the selected console message; and
- indicating selection of the selected console message with a pointing device coupled to the display unit.

19. A computer-readable medium encoded with a program for message handling within a computer system, comprising the functions of:
- selecting a console message from a plurality of console messages, each of the console messages providing corresponding status information regarding a computer system and including a fault status;
- processing messages for command execution and message definition and comprising displaying received messages selectable by an operator to be provided with definition information and displaying a definition window defining plural automatically performed procedures selectable by the operator as definition information for a respective, selected message, the definition information defining at least a portion of a predetermined procedure to be executed automatically by the computer system in response to a selected console message indicating a fault status;
- storing the created definition information; and
- when a console message is selected indicating a fault status, automatically executing the predetermined procedure and thereby correcting the fault.

20. The computer-readable medium of claim 19, wherein the selecting step of said program includes the steps of:
- displaying at least one of the plurality of console messages on a display unit, the at least one console message including the selected console message; and
- indicating selection of the selected console message with a pointing device coupled to the display unit.

21. A message handling method, comprising:
- selecting a console message from a plurality of console messages providing corresponding status information regarding a computer system including a fault status;
- processing messages for command execution and message definition and comprising displaying received messages selectable by an operator to be provided with definition information and displaying a definition window defining plural automatically performed procedures selectable by the operator as definition information for a respective, selected message;

storing the definition information defining at least a portion of a predetermined procedure to be executed automatically by the computer system in response to a selected console message indicating a fault status;

when a console message is selected indicating a fault status, automatically executing the predetermined procedure and thereby correcting the fault.

22. A computer readable medium encoded with a program for message handling within a computer system and comprising a process of:

selecting a console message from a plurality of console messages providing corresponding status information regarding the computer system including a fault status;

processing messages for command execution and message definition and comprising displaying received messages selectable by an operator to be provided with definition information and displaying a definition window defining plural automatically performed procedures selectable by the operator as definition information for a respective, selected message;

storing the definition information defining at least a portion of a predetermined procedure to be executed automatically by the computer system in response to a selected console message indicating a fault status; and when a console message is selected indicating a fault status, automatically executing the predetermined procedure and thereby correcting the fault.

23. A message handling apparatus, comprising:

a message processing unit processing messages for command execution and message definition and comprising a message display unit displaying received messages, a message selecting unit controllable by an operator for selecting a message to be provided with definition information and a definition unit displaying a definition window defining plural automatically performed procedures selectable by the operator as definition information for a respective, selected message;

a response definition unit, coupled to a storage unit and an input device, that dynamically selects a console message from a plurality of console messages, receives the respective definition information input to the input device, and stores the received, respective definition information to the storage unit, each of the plurality of console messages providing corresponding status information regarding a computer system and at least one automatic performance console message providing status information requiring automatic performance of an action of a specified type, other than communicating and/or displaying the status and/or other information of the automatic performance control message, and the received definition information defining, for each automatic performance console message, at least a portion of a corresponding, predetermined procedure to be executed automatically by the message handling apparatus and thereby to perform automatically the required action of the specified type; and a response execution unit coupled to the storage unit and, in response to a selected automatic performance console message requiring performance of an action of a specified type, automatically executing the corresponding, predetermined procedure and thereby automatically performing the required action of the specified type.

24. A message handling apparatus as recited in claim 23, wherein:

the selected automatic performance console message provides status information indicating a fault status and the received definition information defines at least a portion of a corresponding, predetermined procedure to be executed automatically in response to the selected console messenger indicating a fault status thereby to correct the fault; and the response execution unit, in response to the selected automatic performance control message, automatically executes the corresponding, predetermined procedure and thereby automatically corrects the fault.

25. A message handling apparatus as recited in claim 23, wherein:

at least another automatic performance console message provides status information requiring both automatic performance of an action of a specified type and also communicating and/or displaying the status and/or other information of the another automatic performance console message; and the response execution unit, in response to a selected another automatic performance control message, automatically executes the predetermined procedure and thereby automatically performs the required action of the specified type and also communicates and/or displays the status and/or other information of the selected, another automatic performance control message.

26. A method of message handling, comprising:

selecting a console message from a plurality of console messages, each of the plurality of console messages providing corresponding status information regarding a computer system and at least one automatic performance console message providing status information requiring automatic performance of an action of a specified type, other than communicating and/or displaying the status and/or other information of the automatic performance control message;

processing messages for command execution and message definition and comprising displaying received messages selectable by an operator to be provided with definition information and displaying a definition window defining plural automatically performed procedures selectable by the operator as definition information for a respective, selected message and thereby, for each automatic performance console message, providing definition information defining at least a portion of a corresponding predetermined procedure to be executed automatically and thereby to perform automatically the required action of the specified type;

storing the provided definition information; and when an automatic performance console message is selected requiring performance of an action of a specified type, automatically executing the corresponding predetermined procedure and thereby automatically performing the required action of the specified type.

27. A method of message handling as recited in claim 26, wherein the selected automatic performance console message provides status information indicating a fault status and the received definition information defines at least a portion of a corresponding, predetermined procedure to be executed automatically in response to the selected console message indicating a fault status thereby to correct the fault, further comprising:

in response to the selected, automatic performance control message, automatically executing the corresponding, predetermined procedure and thereby automatically correcting the fault.

28. A method of message handling apparatus as recited in claim 26, wherein at least another automatic performance console message provides status information requiring both automatic performance of an action of a specified type and also communicating and/or displaying the status and/or other information of the another automatic performance console message, further comprising:

in response to a selected, automatic performance control message, automatically executing the predetermined procedure and thereby automatically performing the required action of the specified type and also communicating and/or displaying the status and/or other information of the selected, another automatic performance control message.

29. A computer-readable medium encoded with a program for message handling within a computer system, by:

selecting a console message from a plurality of console messages, each of the plurality of console messages providing corresponding status information regarding a computer system and at least one automatic performance console message providing status information requiring automatic performance of an action of a specified type, other than communicating and/or displaying the status and/or other information of the automatic performance control message;

processing messages for command execution and message definition and comprising displaying received messages selectable by an operator to be provided with definition information and displaying a definition window defining plural automatically performed procedures selectable by the operator as definition information for a respective, selected message and thereby, for each automatic performance console message, providing definition information defining at least a portion of a corresponding predetermined procedure to be executed automatically and thereby to perform automatically the required action of the specified type;

storing the provided definition information; and when an automatic performance console message is selected requiring performance of an action of a specified type, automatically executing the corresponding predetermined procedure and thereby automatically performing the required action of the specified type.

30. A computer-readable medium as recited in claim 29, wherein the selected automatic performance console message provides status information indicating a fault status and the received definition information defines at least a portion of a corresponding, predetermined procedure to be executed automatically in response to the selected console messenger indicating a fault status thereby to correct the fault, further comprising:

in response to the selected, automatic performance control message, automatically executing the corresponding, predetermined procedure and thereby automatically correcting the fault.

31. A computer-readable medium as recited in claim 29, wherein at least another automatic performance console message provides status information requiring, both automatic performance of an action of a specified type and also communicating and/or displaying the status and/or other information of the another automatic performance console message, further comprising:

in response to a selected, automatic performance control message, automatically executing the predetermined procedure and thereby automatically performing the required action of the specified type and also communicating and/or displaying the status and/or other information of the another automatic performance control message.

* * * * *